United States Patent
Chien

(10) Patent No.: US 10,799,920 B2
(45) Date of Patent: Oct. 13, 2020

(54) METHOD AND APPARATUS FOR REMOVING CONDUCTIVE FILM

(71) Applicants: HKC CORPORATION LIMITED, Shenzhen (CN); CHONGQING HKC OPTOELECTRONICS TECHNOLOGY CO., LTD., Chongqing (CN)

(72) Inventor: Chungkuang Chien, Chongqing (CN)

(73) Assignees: HKC CORPORATION LIMITED, Shenzhen (CN); CHONGQING HKC OPTOELECTRONICS TECHNOLOGY CO., LTD., Chongqing (CN)

( * ) Notice: Subject to any disclaimer, the term of this patent is extended or adjusted under 35 U.S.C. 154(b) by 276 days.

(21) Appl. No.: 15/744,041

(22) PCT Filed: May 22, 2017

(86) PCT No.: PCT/CN2017/085336
§ 371 (c)(1),
(2) Date: Jan. 11, 2018

(87) PCT Pub. No.: WO2018/090592
PCT Pub. Date: May 24, 2018

(65) Prior Publication Data
US 2019/0022713 A1    Jan. 24, 2019

(30) Foreign Application Priority Data
Nov. 15, 2016 (CN) .......................... 2016 1 1005514

(51) Int. Cl.
B08B 7/00 (2006.01)
B08B 1/00 (2006.01)
(Continued)

(52) U.S. Cl.
CPC ............ *B08B 7/0042* (2013.01); *B08B 1/006* (2013.01); *B08B 1/008* (2013.01); *B08B 1/02* (2013.01);
(Continued)

(58) Field of Classification Search
CPC ....... B08B 7/0042; B08B 1/006; B08B 1/008; B08B 1/02; B08B 3/041; B08B 3/08;
(Continued)

(56) References Cited

U.S. PATENT DOCUMENTS 5,669,979 A * 9/1997 Elliott ................... B08B 7/0042
                                                          134/1
6,066,032 A * 5/2000 Borden ................... B24C 1/003
                                                          134/1
(Continued)

FOREIGN PATENT DOCUMENTS

CN   102357736 A   2/2012
CN   202398941 U   8/2012
(Continued)

OTHER PUBLICATIONS

CN202667927U—Machine translation (Year: 2012).*
SIPO Office Action of corresponding Chinese patent application dated May 31, 2018.

*Primary Examiner* — Tinsae B Ayalew
(74) *Attorney, Agent, or Firm* — Platinum Intellectual Property LLP

(57) ABSTRACT

The present disclosure discloses a method and an apparatus for removing a conductive film. The method includes: providing a display panel with the conductive film to be removed; treating the conductive film to be removed on the display panel by using a laser; and cleaning the display panel after the treating by using the laser.

11 Claims, 3 Drawing Sheets

(51) Int. Cl.
*B08B 1/02* (2006.01)
*B08B 3/04* (2006.01)
*B23K 26/362* (2014.01)
*G02F 1/13* (2006.01)
*B08B 3/08* (2006.01)
*B23K 26/70* (2014.01)
*G02B 27/00* (2006.01)
*B23K 26/402* (2014.01)
*B23K 26/361* (2014.01)
*B23K 26/08* (2014.01)
*B23K 26/16* (2006.01)
*G02F 1/1345* (2006.01)
*B23K 101/38* (2006.01)
*B23K 103/16* (2006.01)
*B23K 101/42* (2006.01)

(52) U.S. Cl.
CPC .............. *B08B 3/041* (2013.01); *B08B 3/08* (2013.01); *B23K 26/0823* (2013.01); *B23K 26/0838* (2013.01); *B23K 26/16* (2013.01); *B23K 26/361* (2015.10); *B23K 26/362* (2013.01); *B23K 26/402* (2013.01); *B23K 26/702* (2015.10); *G02B 27/0006* (2013.01); *G02F 1/1309* (2013.01); *B23K 2101/38* (2018.08); *B23K 2101/42* (2018.08); *B23K 2103/172* (2018.08); *G02F 1/1345* (2013.01); *G02F 1/13452* (2013.01); *G02F 2001/1316* (2013.01)

(58) Field of Classification Search
CPC ............... B23K 26/361; B23K 26/702; B23K 26/0823; B23K 26/0838; B23K 26/16; B23K 26/362; B23K 26/402; G02B 27/0006; G02F 1/1309; G02F 1/1345; G02F 1/13452
USPC ......................................................... 134/198
See application file for complete search history.

(56) References Cited

U.S. PATENT DOCUMENTS

| | | | |
|---|---|---|---|
| 2008/0070393 A1* | 3/2008 | Miyairi | B23K 26/0884 438/585 |
| 2012/0067699 A1* | 3/2012 | Pasqualoni | B65G 45/22 198/495 |
| 2015/0108461 A1* | 4/2015 | Mandlik | H01L 51/56 257/40 |

FOREIGN PATENT DOCUMENTS

| | | |
|---|---|---|
| CN | 202667927 U | 1/2013 |
| CN | 102978672 A | 3/2013 |
| CN | 203076791 U | 7/2013 |
| CN | 103747626 A | 4/2014 |
| CN | 203509352 U | 4/2014 |
| CN | 104020919 A | 9/2014 |
| CN | 106583346 A | 4/2017 |
| EP | 2543466 A1 | 1/2013 |
| JP | 2005166534 A | 6/2005 |

* cited by examiner

METHOD AND APPARATUS FOR REMOVING CONDUCTIVE FILM

CROSS REFERENCE TO RELATED APPLICATION

This application claims priority to Chinese Patent Application No. 201611005514.1, entitled "METHOD AND APPARATUS FOR REMOVING CONDUCTIVE FILM" filed on Nov. 15, 2016, the contents of which are expressly incorporated by reference herein in its entirety.

FIELD OF THE INVENTION

The present disclosure relates to the field of display panels, and more particularly relates to a method and an apparatus for removing a conductive film.

BACKGROUND OF THE INVENTION

When applying a conductive film, such as an anisotropic conductive film (ACF), to a liquid crystal display (LCD), the ACF often requires to be reworked due to poor process or material deterioration. In a conventional method, the ACF bonded on the display panel is usually removed manually, and then the ACF is attached. Such reworking method suffers some problems such as inadequate cleaning or scratching the display panel, thereby reducing product yield and increasing labor costs.

SUMMARY

According to various embodiments of the present disclosure, a method and an apparatus for removing a conductive film are provided, which can improve product yield and reduce labor costs.

A method for removing a conductive film includes:
providing a display panel with the conductive film to be removed;
treating the conductive film to be removed on the display panel by using a laser; and
cleaning the display panel after the treating by using the laser.

In one embodiment, the step of treating the conductive film to be removed on the display panel by using the laser is:
removing the conductive film to be removed on the display panel by using a laser etching method.

In one embodiment, the step of treating the conductive film to be removed on the display panel by using the laser is:
treating the conductive film to be removed by using the laser, so as to reduce a viscosity of the conductive film.

In one embodiment, the method further includes a step of providing an isolation region on the display panel, wherein the isolation region is configured to isolate the conductive film from other regions of the display panel.

In one embodiment, the step of cleaning the display panel after the treating by using the laser comprises:
spraying a cleaning solution on a laser treatment region, and cleaning the display panel by using a cleaning tool.

In one embodiment, the cleaning tool is a flexible wiping tool; the cleaning solution is an organic solvent having hydrophilicity and lipophilicity.

In one embodiment, the cleaning tool is a nonwoven fabric; the cleaning solution is an isopropanol solution.

In one embodiment, the step of cleaning the display panel after the treating by using the laser comprises: cleaning the display panel using a cleaning tool sprayed with a cleaning solution.

An apparatus for removing a conductive film includes:
a carrying platform configured to carry a display panel with the conductive film to be removed;
a laser member disposed above the carrying platform, wherein the laser member is configured to generate a laser to treat the conductive film to be removed on the display panel; and
a cleaning member disposed above the carrying platform, wherein the cleaning member is configured to clean the display panel treated by the laser member.

In one embodiment, the apparatus further includes a driving member configured to drive the display panel on the carrying platform to move from an operating area of the laser member to an operating area of the cleaning member.

In one embodiment, the carrying platform is a conveyor belt; the laser member and the cleaning member are sequentially arranged along a longitudinal direction of the conveyor belt; the driving member is configured to control the conveyor belt to move, so as to move the display panel to a corresponding operating area.

In one embodiment, the carrying platform is a rotatable structure; the driving member is configured to drive the carrying platform to rotate, so as to rotate the display panel into an operating area below a corresponding equipment.

In one embodiment, the apparatus further includes a fixing member configured to fix the carrying platform, the laser member, and the cleaning member; wherein the fixing member is a bracket structure with an adjustable height.

In one embodiment, the laser member includes:
a laser head; and
a first fixing adjustment unit connected to the laser head; wherein the first fixing adjustment unit is configured to adjust a distance between the laser head and the display panel and is configured to adjust an incident angle of the laser.

In one embodiment, the cleaning member includes:
a cleaning tool; and
a second fixing adjustment unit; wherein the second fixing adjustment unit is configured to fix the cleaning tool and adjust a distance between the cleaning tool and the display panel.

In one embodiment, the cleaning member further includes a cleaning solution spraying apparatus fixed to the second adjustment unit; the cleaning solution spraying apparatus is configured to spray on a treatment region of the laser member or configured to spray on the cleaning tool.

In one embodiment, the cleaning tool is a flexible wiping tool; the cleaning solution is an organic solvent having hydrophilicity and lipophilicity.

In one embodiment, the cleaning tool is a nonwoven fabric; the cleaning solution is an isopropanol solution.

In one embodiment, the laser member includes an isolation unit configured to isolate the conductive film from other regions of the display panel.

An apparatus for removing a conductive film includes:
a carrying platform configured to carry a display panel with the conductive film to be removed;
a laser member disposed above the carrying platform, wherein the laser member is configured to generate a laser to treat the conductive film to be removed on the display panel; the laser member included a first fixing adjustment unit and a laser head; the first fixing adjustment unit is connected to the laser head; the first fixing adjustment unit is configured to adjust a distance between the laser head and the display panel and is configured to adjust an incident angle of the laser;

a cleaning member disposed above the carrying platform, wherein the cleaning member is configured to clean the display panel treated by the laser member; the cleaning member includes a second fixing adjustment unit and a cleaning tool; the cleaning tool is fixed to the second fixing adjustment unit; the second fixing adjustment unit is configured to adjust a distance between the cleaning tool and the display panel;

a fixing member configured to fix the carrying platform, the laser member, and the cleaning member; and a driving member configured to drive the display panel on the carrying platform to move from an operating area of the laser member to an operating area of the cleaning member.

According to the foregoing method and apparatus for removing a conductive film, the conductive film to be removed on the display panel is treated by using a laser, and then the display panel is cleaned, thereby eliminating the need for manual removal of a conductive film requiring rework, reducing labor costs, meanwhile reducing the display panel scratches caused by the human factors, and improving product yield.

BRIEF DESCRIPTION OF THE DRAWINGS

To illustrate the technical solutions according to the embodiments of the present disclosure or in the prior art more clearly, the accompanying drawings for describing the embodiments or the prior art are introduced briefly in the following. The accompanying drawings in the following description are only some embodiments of the present invention, and persons of ordinary skill in the art can derive other obvious variations from the accompanying drawings without creative efforts.

DETAILED DESCRIPTION OF THE EMBODIMENTS

Embodiments of the disclosure are described more fully hereinafter with reference to the accompanying drawings. The various embodiments of the disclosure may, however, be embodied in many different forms and should not be construed as limited to the embodiments set forth herein. Rather, these embodiments are provided so that this disclosure will be thorough and complete, and will fully convey the scope of the disclosure to those skilled in the art.

Figure 1:
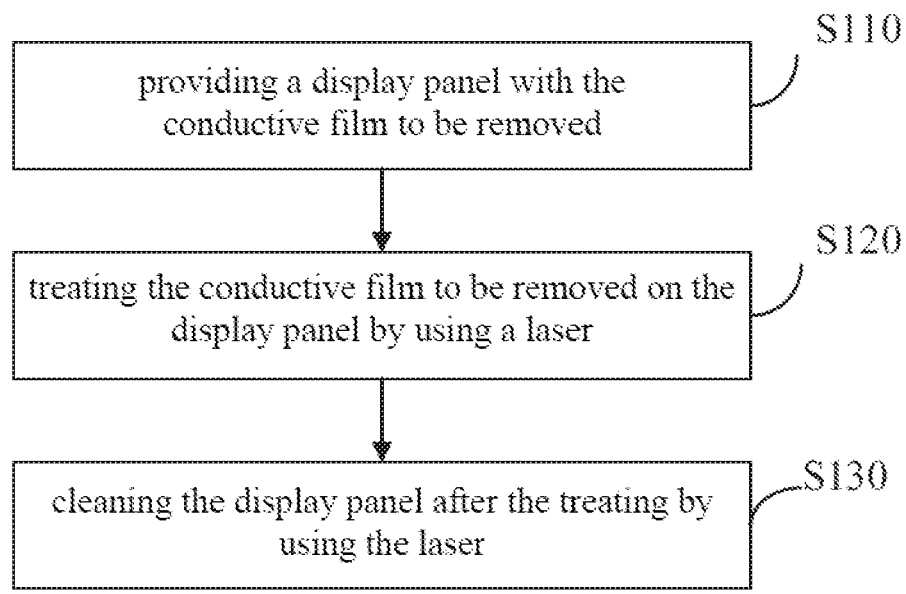
FIG. 1 is a flowchart of a method for removing a conductive film according to an embodiment.

FIG. 1 is a flowchart of a method for removing a conductive film according to an embodiment. The method can be applied to a case where a display panel is required to perform reworking to the conductive film due to poor process or material deterioration in the process of attaching conductive film. In the illustrated embodiment, a conductive film having a conductive anisotropy (i.e., the anisotropic conductive film ACF) is described as an example. Without being limited thereto, the method in the illustrated embodiment may also be used to remove other conductive films having adhesive properties.

The method includes the following steps of:

In step S110, the display panel with the conductive film to be removed is provided.

Figure 2:
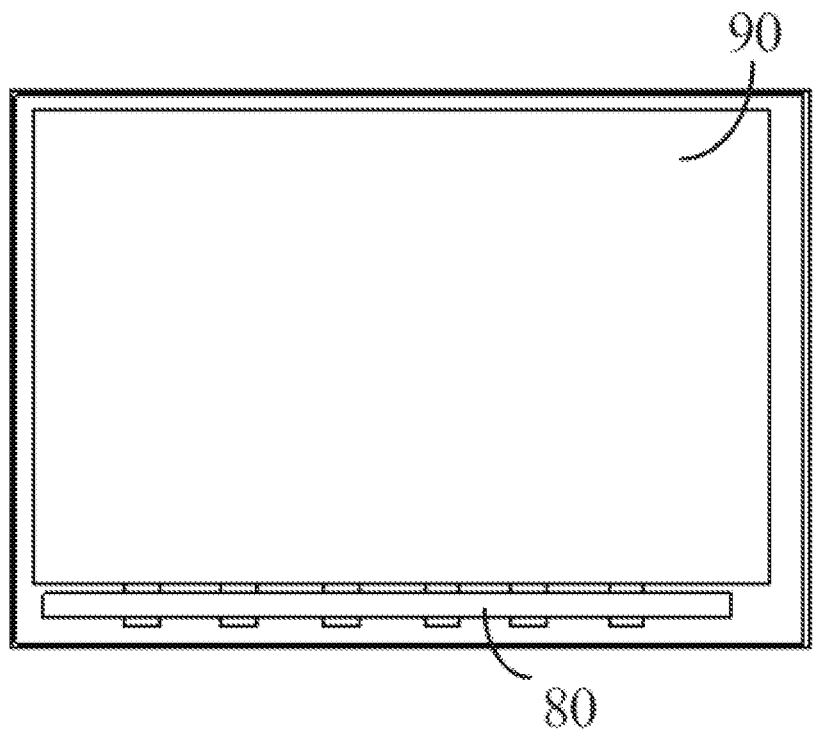
FIG. 2 is a schematic view of a display panel with a conductive film to be removed.

The display panel required to remove the conductive film is placed on the carrying platform to perform the subsequent operations. A schematic view of the display panel with the conductive film to be removed is shown in FIG. 2. 90 denotes the display panel, and 80 denotes the conductive film.

In step S120, the conductive film to be removed on the display panel is treated by using a laser.

In the process of treating the conductive film on the display panel by using the laser, the conductive film on the display panel can be directly removed by using a laser etching process or the conductive film can be treated by using the laser, so as to reduce an adhesive property of the conductive film. During the laser treatment, a laser head is not in contact with the display panel, but is located above the display panel. The laser wavelength can be selected and adjusted according to the resin type and its stereotyped behavior of the conductive film. The laser energy density can also be selected and adjusted according to the thickness of the conductive film and the amount of residual glue. In one embodiment, the laser head may be rotatable. In order to avoid interference with the display panel, an isolation region is further provided when performing the laser treatment, such that the conductive film is isolated from other regions of the display panel, thereby causing the laser to treat the region only.

In step S130, the display panel is cleaned after the treating by using the laser.

After the laser treatment, it is necessary to clean the conductive film that loses viscosity or the residual material on the display panel. Specifically, in the process of cleaning, a cleaning solution may be sprayed on a laser treatment region, and then the display panel may be cleaned with a dedicated cleaning tool. In alternative embodiments, the cleaning solution may be sprayed on the cleaning tool, and then the display panel may be cleaned with a cleaning tool sprayed with the cleaning solution. The cleaning tool may use a flexible wiping tool to avoid scratching the display panel. The cleaning solution is an organic solvent having hydrophilicity and lipophilicity, thereby removing the residual material well. In the illustrated embodiment, the cleaning tool is a nonwoven fabric (also referred to as a nonwoven cloth). Nonwoven fabric is made of oriented or random fiber, and it is a new generation of environmentally friendly materials, with moisture, breathable, flexible, light, non-combustion, easy to break down, non-toxic and non-irritating, low prices, recyclable and so on. In alternative embodiments, other materials that are flexible and do not scratch the display panel circuit may also be used. The cleaning solution is an isopropanol solution (IPA). In alternative embodiments, the other cleaning solution capable of being freely mixed with water and having a good solubility to an oleophilic substance may be used.

According to the foregoing method for removing the conductive film, the conductive film to be removed on the display panel is treated by using the laser, and then the display panel is cleaned, thereby eliminating the need for manual removal of the conductive film requiring rework, reducing labor costs, meanwhile reducing the display panel scratches caused by the human factors, improving product yield. The foregoing method can be applied to display panels such as LCD display panels, OLED display panels, QLED display panels, and the like, meanwhile the foregoing method can be applied to flat display panel or curved display panel. It should be understood that the types of display panels to which the foregoing method can be applied include, but are not limited to, the foregoing types of display panels.

Figure 3:
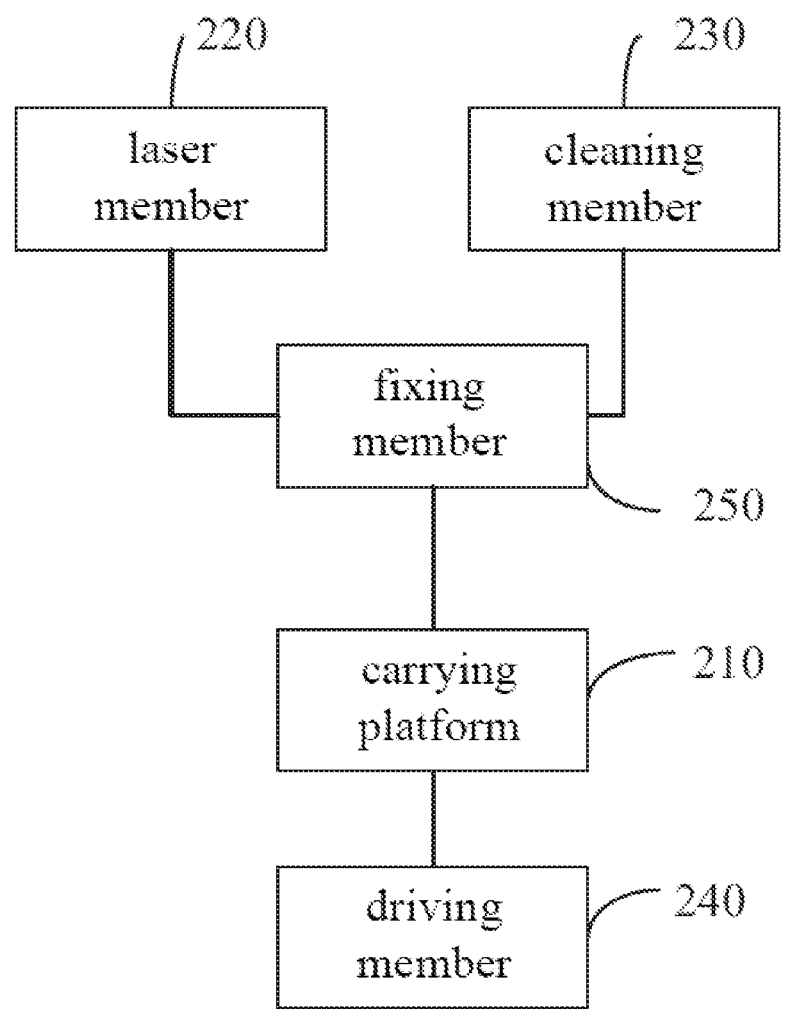
FIG. 3 is a block diagram of an apparatus for removing a conductive film according to an embodiment.

The present disclosure further provides an apparatus for removing the conductive film which can realize the foregoing method. FIG. 3 is a block diagram of the apparatus for removing the conductive film according to an embodiment. The apparatus for removing the conductive film includes a carrying platform 210, a laser member 220 and a cleaning member 230.

The carrying platform 210 is configured to carry the display panel with the conductive film to be removed. The laser member 220 is disposed above the carrying platform 210. The laser member 220 is configured to generate a laser to treat the conductive film to be removed on the display panel. The cleaning member 230 is configured to clean the display panel treated by the laser member 210.

In the foregoing apparatus for removing the conductive film, the laser member 220 treats the conductive film to be removed on the display panel by using the laser, and then the display panel is cleaned by the cleaning member 230, thereby eliminating the need for manual removal of the conductive film requiring rework, reducing labor costs, meanwhile reducing the display panel scratches caused by the human factors, and improving product yield.

The foregoing apparatus for removing the conductive film further includes a driving member 240. The driving member 240 is configured to drive the display panel on the carrying platform 210 to move from an operating area of the laser member 220 to an operating area of the cleaning member 230, thereby realizing the automation of the entire process without manual participation. In an embodiment, the carrying platform 210 may be a conveyor belt. At this time, the laser member 220 and the cleaning member 230 are sequentially arranged along a longitudinal direction of the conveyor belt. Thus, the driving member 240 can control the conveyor belt to move, so as to move the display panel to a corresponding operating area. For example, the driving member 240 can control the movement of the conveyor belt to move the display panel to the operating area of the laser member 220. After the operation of the laser member 220 is completed, the display panel is moved to the operating area of the cleaning member 230 so as to complete the cleaning operation. In alternative embodiments, the carrying platform 210 may be a rotatable structure. Thus, the driving member can drive the carrying platform 210 to rotate, such that the display panel may be rotated to an operating area below the corresponding equipment according to requirements, so as to complete the corresponding operation. It should be understood that the carrying platform 210 includes, but is not limited to, the aforementioned structure.

In one embodiment, the foregoing apparatus for removing the conductive film may further includes a fixing member 250. The fixing member 250 is configured to fix the carrying platform 210, the laser member 220, and the cleaning member 230. Specifically, the fixing member 250 is a bracket structure with an adjustable height, so as to adjust heights of the carrying platform 210, the laser member 220, or the cleaning member 230 in accordance with the operational requirements.

Figure 4:
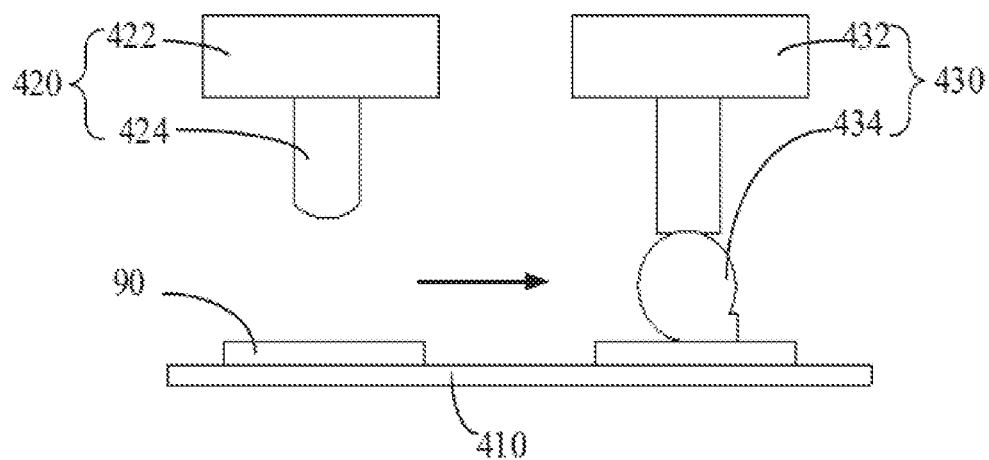
FIG. 4 is a schematic view of an apparatus for removing a conductive film according to an embodiment.

FIG. 4 is a schematic view of an apparatus for removing the conductive film according to an embodiment. The apparatus for removing the conductive film includes a carrying platform 410, a laser member 420, and a cleaning member 430.

The laser member 420 includes a first fixing adjustment unit 422 and a laser head 424. The first fixing adjustment unit 422 is connected to the laser head 424. The first fixing adjustment unit 422 may adjust a distance between the laser head 424 and the display panel and adjust an incident angle of the laser. In other words, in the illustrated embodiment, the laser head 424 is a rotatable structure. The wavelength of the laser emitted by the laser head 424 can be selected and adjusted according to the resin type and its stereotyped behavior of the conductive film. The laser energy density can also be selected and adjusted according to the thickness of the conductive film and the amount of residual glue. In an embodiment, the laser member 420 may further includes an isolation unit to isolate the conductive film region from other regions of the display panel, thereby causing the laser to treat the region only.

The cleaning member 430 includes a second fixing adjustment unit 432 and a cleaning tool 434. The second fixing adjustment unit 432 is configured to adjust a distance between the cleaning tool 434 and the display panel, as well as the magnitude of the force, thereby ensuring that the cleaning tool 434 uniformly applies force to the display panel, so as to prevent the display panel from being scratched. In an embodiment, the cleaning member 430 may further includes a cleaning solution spraying apparatus. The cleaning solution spraying apparatus is fixed to the second adjustment unit 432. The cleaning solution spraying apparatus is configured to spray on a treatment region of the laser member 420 or configured to directly spray on the cleaning tool 434. The second fixing adjustment unit 432 may be a mechanical arm or a moving element, so as to control the cleaning tool 434 to wipe left and right or up and down, thereby achieving the purpose of cleaning. The cleaning tool may use a flexible wiping tool to avoid scratching the display panel. The cleaning solution is an organic solvent having hydrophilicity and lipophilicity, thereby removing the residual material well. In the illustrated embodiment, the cleaning tool is a nonwoven fabric. In alternative embodiments, other materials that are flexible and do not scratch the display panel circuit may also be used. The cleaning solution may be, for example, an isopropanol solution (IPA). In alternative embodiments, the other cleaning solution capable of being freely mixed with water and having a good solubility to an oleophilic substance may be used.

Figure 5:
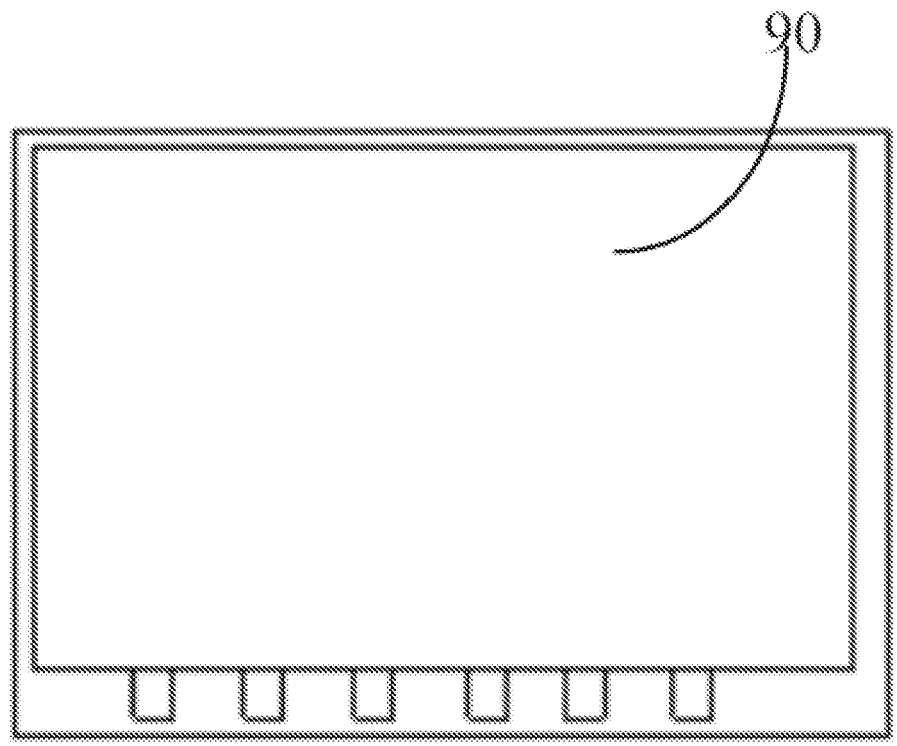
FIG. 5 is a schematic view of a display panel after removing a conductive film.

FIG. 5 is a schematic view of the display panel after removing the conductive film by the aforementioned apparatus and method. By using the aforementioned apparatus and method, the automatic cleaning of the conductive film can be realized, the labor cost is effectively reduced, and the display panel may not be scratched, thereby improving the yield of the product reworking and reducing the product scrap rate.

The foregoing apparatus can be applied to display panels such as LCD display panels, OLED display panels, QLED display panels, and the like, meanwhile the foregoing apparatus can be applied to flat display panel or curved display panel. It should be understood that the types of display panels to which the foregoing apparatus can be applied include, but are not limited to, the foregoing types of display panels.

Although the respective embodiments have been described one by one, it shall be appreciated that the respective embodiments will not be isolated. Those skilled in the art can apparently appreciate upon reading the disclosure of this application that the respective technical features involved in the respective embodiments can be combined arbitrarily between the respective embodiments as long as they have no collision with each other.

Although the description is illustrated and described herein with reference to certain embodiments, the description is not intended to be limited to the details shown. Modifications may be made in the details within the scope and range equivalents of the claims.

What is claimed is:

1. An apparatus for removing a conductive film, comprising:
   a carrying platform configured to carry a display panel with the conductive film to be removed;
   a laser member disposed above the carrying platform, wherein the laser member is configured to generate a laser to treat the conductive film to be removed on the display panel;
   a cleaning member disposed above the carrying platform, wherein the cleaning member is configured to clean the display panel treated by the laser member; and
   a fixing member configured to fix the carrying platform, the laser member, and the cleaning member; wherein the fixing member is a bracket structure with an adjustable height.

2. The apparatus according to claim 1, further comprising a driving member configured to drive the display panel on the carrying platform to move from an operating area of the laser member to an operating area of the cleaning member.

3. The apparatus according to claim 2, wherein the carrying platform is a conveyor belt; the laser member and the cleaning member are sequentially arranged along a longitudinal direction of the conveyor belt; the driving member is configured to control the conveyor belt to move, so as to move the display panel to a corresponding operating area.

4. The apparatus according to claim 2, wherein the carrying platform is a rotatable structure; the driving member is configured to drive the carrying platform to rotate, so as to rotate the display panel into an operating area below a corresponding equipment.

5. The apparatus according to claim 1, wherein the laser member comprises:
   a laser head; and
   a first fixing adjustment unit connected to the laser head; wherein the first fixing adjustment unit is configured to adjust a distance between the laser head and the display panel and is configured to adjust an incident angle of the laser.

6. The apparatus according to claim 1, wherein the cleaning member comprises:
   a cleaning tool; and
   a second fixing adjustment unit; wherein the second fixing adjustment unit is configured to fix the cleaning tool and adjust a distance between the cleaning tool and the display panel.

7. The apparatus according to claim 6, wherein the cleaning member further comprises a cleaning solution spraying apparatus fixed to the second fixing adjustment unit; the cleaning solution spraying apparatus is configured to spray on a treatment region of the laser member or configured to spray on the cleaning tool.

8. The apparatus according to claim 7, wherein the cleaning tool is a flexible wiping tool; the cleaning solution is an organic solvent having hydrophilicity and lipophilicity.

9. The apparatus according to claim 8, wherein the cleaning tool is a nonwoven fabric; the cleaning solution is an isopropanol solution.

10. The apparatus according to claim 1, wherein the laser member comprises an isolation unit configured to isolate the conductive film from other regions of the display panel.

11. An apparatus for removing a conductive film, comprising:
    a carrying platform configured to carry a display panel with the conductive film to be removed;
    a laser member disposed above the carrying platform, wherein the laser member is configured to generate a laser to treat the conductive film to be removed on the display panel; the laser member comprises a first fixing adjustment unit and a laser head; the first fixing adjustment unit is connected to the laser head; the first fixing adjustment unit is configured to adjust a distance between the laser head and the display panel and is configured to adjust an incident angle of the laser;
    a cleaning member disposed above the carrying platform, wherein the cleaning member is configured to clean the display panel treated by the laser member; the cleaning member comprises a second fixing adjustment unit and a cleaning tool; the cleaning tool is fixed to the second fixing adjustment unit; the second fixing adjustment unit is configured to adjust a distance between the cleaning tool and the display panel;
    a fixing member configured to fix the carrying platform, the laser member, and the cleaning member; and
    a driving member configured to drive the display panel on the carrying platform to move from an operating area of the laser member to an operating area of the cleaning member.

* * * * *